United States Patent [19]

Edwards

[11] Patent Number: 5,023,591
[45] Date of Patent: Jun. 11, 1991

[54] ANTI-THEFT CONTROL APPARATUS

[75] Inventor: Allen V. Edwards, 1528 Geraldine St., Bethlehem, Pa. 18017

[73] Assignee: Allen V. Edwards, Bethlehem, Pa.

[21] Appl. No.: 437,279

[22] Filed: Nov. 15, 1989

[51] Int. Cl.⁵ .............................................. B60R 25/00
[52] U.S. Cl. ..................................... 340/426; 180/287; 307/10.2; 307/10.7; 429/7; 429/150
[58] Field of Search ................... 340/425.5, 426, 428; 180/287; 307/10.2, 10.3, 10.4, 10.6, 10.7; 429/7, 150

[56] References Cited

U.S. PATENT DOCUMENTS

| | | | |
|---|---|---|---|
| 3,425,033 | 1/1969 | Pfund | 340/426 |
| 3,643,214 | 2/1972 | Chan | 340/430 |
| 3,924,162 | 12/1975 | Nocerino | 307/10.2 |
| 4,000,409 | 12/1976 | Graziosi | 307/10.4 |
| 4,223,298 | 9/1980 | Bernier . | |
| 4,418,330 | 11/1983 | Kamichik | 307/10.4 |
| 4,463,340 | 7/1984 | Adkins et al. . | |
| 4,473,815 | 9/1984 | Miller, Sr. . | |
| 4,553,127 | 11/1985 | Issa | 180/287 |
| 4,553,511 | 11/1985 | Hayakawa et al. . | |
| 4,672,224 | 6/1987 | Low | 340/426 |
| 4,673,914 | 6/1987 | Lee | 180/287 |
| 4,682,062 | 7/1987 | Weinberger . | |
| 4,689,603 | 8/1987 | Conigilaro et al. . | |
| 4,754,255 | 6/1988 | Sanders et al. . | |
| 4,761,631 | 8/1988 | Hwang . | |
| 4,798,968 | 1/1989 | Deem | 307/10.7 |
| 4,832,146 | 5/1989 | Luby | 307/10.2 |
| 4,861,684 | 8/1989 | Law | 429/150 |

Primary Examiner—Joseph A. Orsino
Assistant Examiner—Brent A. Swarthout
Attorney, Agent, or Firm—Perman & Green

[57] ABSTRACT

A theft deterrent system according to which the battery of a motor vehicle is selectively rendered inoperative. A numbered code is manually entered onto a key pad which may be located on the dashboard of the motor vehicle. The key pad is connected to an integrated circuit which is an integral component of the battery. When the proper numbered code is entered, the battery is rendered either operative or inoperative, as desired. When the battery has been inactivated and an incorrect number is entered, as by an unauthorized person, the battery remains inactivated, but an alarm is energized.

13 Claims, 2 Drawing Sheets

ANTI-THEFT CONTROL APPARATUS

FIELD OF THE INVENTION

The present invention relates generally to apparatus for deterring theft or unauthorized use of a motor vehicle and, more particularly, to apparatus which renders the battery for the motor vehicle selectively inoperative.

DESCRIPTION OF THE PRIOR ART

Numerous and diverse types of systems for preventing theft of motor vehicles have been devised, but the known systems are generally far from entirely satisfactory, which is evident from the fact that this problem of motor vehicle thefts has not diminished. Thus, one type of system includes mechanical locking devices, for example for locking the steering wheel or accelerator pedal; but such mechanical devices are inconvenient to use, time-consuming in applying and removing, and easily rendered ineffective by professional thieves having equipment for breaking or cutting the mechanical devices. Another type of theft-prevention system includes alarms which are actuated when an unauthorized attempt is made to penetrate the vehicle; such systems, however, usually suffer from a high rate of false alarms thereby diminishing their credibility when actuated, and also subjecting the owner to considerable inconvenience. Typical of this type of system is U.S. Pat. No. 4,761,631. A third type of anti-theft system includes electrical switches or similar devices located at a secret location known only to the authorized user which can be used for disabling the vehicle ignition system, the fuel supply, or the like, in order to prevent the operation of the vehicle; such secret switches, however, are easily circumvented by a professional thief by merely tracking the wires under the hood. Typical of this type of system are U.S. Pat. Nos. 4,223,298 and 4,473,815. A still further type of anti-theft system includes a coding device, such as a keyboard, which allows the operator to input a code. The inputted code is compared to a predetermined code stored within the system to control an enabling device which enables the starting and operation of the vehicle only when a match occurs. Examples of the latter type of anti-theft systems are described in U.S. Pat. Nos. 4,463,340, 4,553,511, 4,682,062, 4,689,603, and 4,754,255.

The present invention serves to provide an anti-theft system for motor vehicles of the latter type but has advantages in a number of respects as will be described more particularly below.

SUMMARY OF THE INVENTION

Thus, a theft deterrent system is disclosed which renders the battery of a motor vehicle selectively inoperative. A numbered code is manually entered onto a key pad which may be located on the dashboard of the motor vehicle. The key pad is connected to an integrated circuit which is an integral component of the battery. When the proper numbered code has been entered, the battery is rendered either operative or inoperative, as desired. When the battery has been inactivated and an incorrect number is entered, as by an unauthorized person, the battery remains inactivated, but an alarm is energized.

While the key pad and an associated connector are external of the battery, the operating circuitry is fully embedded within the battery and any attempt to counteract an inoperative command previously imparted to the battery can only be achieved reasonably by entry of the correct code. Removal of the key pad and its associated connector will not have any effect on the inoperative condition of the battery.

The present invention utilizes readily available hardware, can be relatively easily manufactured, and is light weight and compact.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Figure 1:
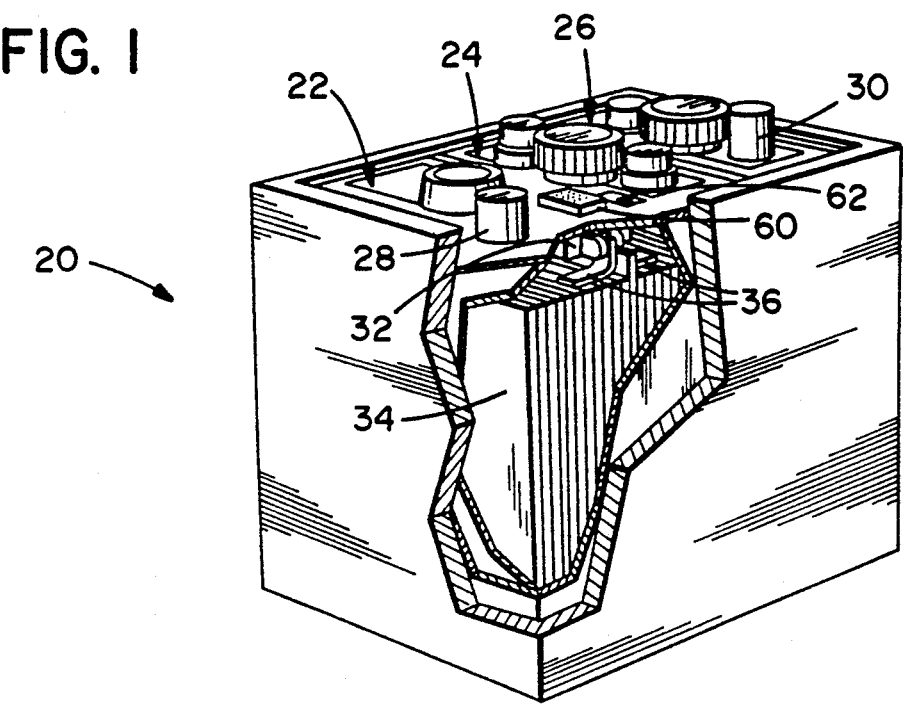
FIG. 1 is a perspective view of a battery, certain parts being cut away and shown in section, embodying the present invention.

Turn now to the drawings and, initially, to FIG. 1 which illustrates a motor vehicle battery 20 embodying the present invention. Although modern motor vehicle batteries customarily contain six cells, for purposes of clarity, the battery 20 is illustrated as having three cells, respectively identified by reference numerals 22, 24, and 26. In the usual fashion, the battery 20 is provided with a pair of terminal posts 28, 30 by means of which it is suitably connected into the electrical system for the motor vehicle. That is, the sum of the electromotive force (EMF) generated by each of the cells 22, 24, 26 is provided at and between the terminal posts 28, 30.

Figure 2:
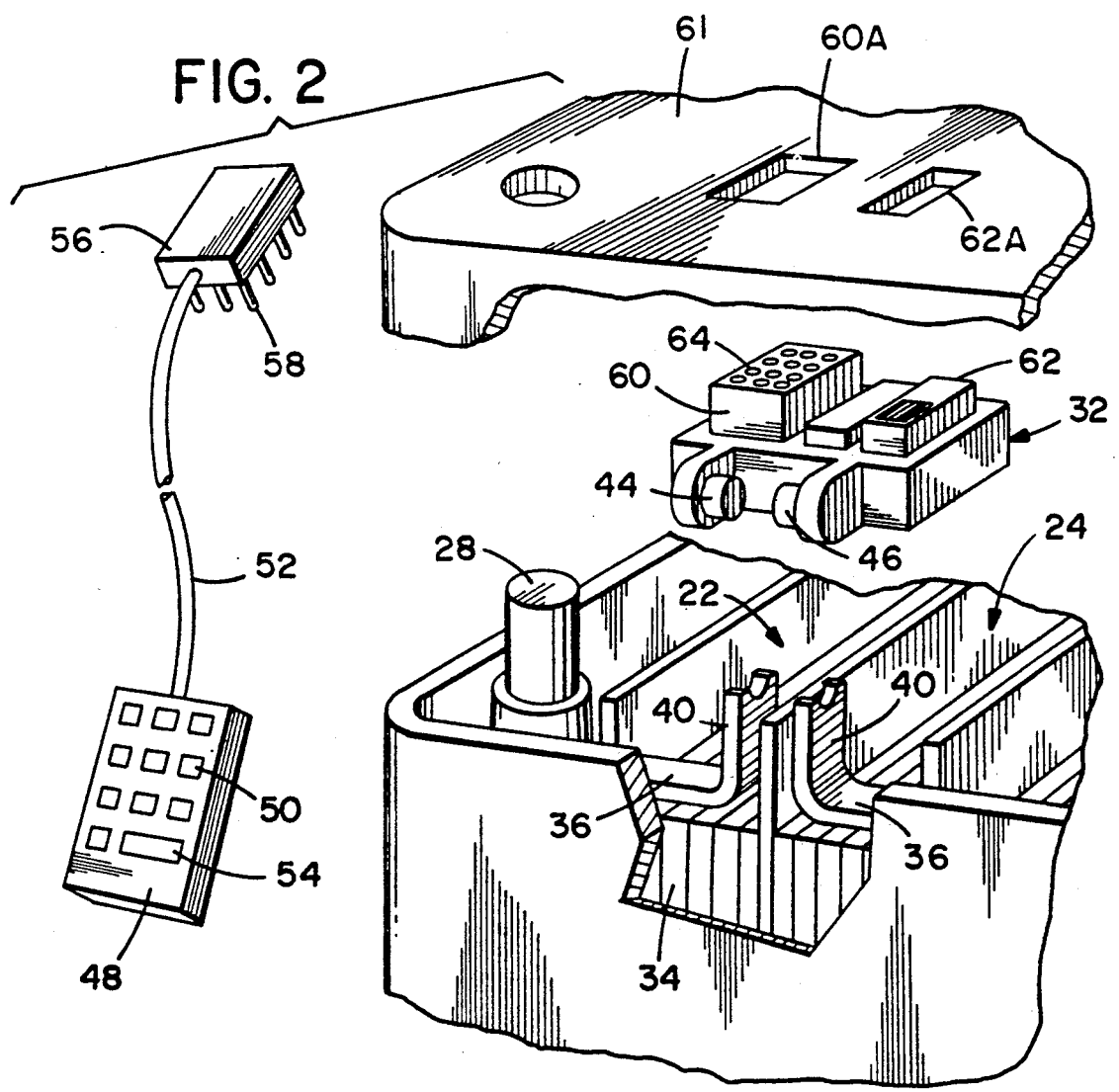
FIG. 2 is a detail exploded perspective view illustrating portions of the battery depicted in FIG. 1.

Turn now to FIG. 2 which illustrates a specialized circuit board 32 which is suitably mounted to the interior of the battery 20 and potted to protect it from the corrosive conditions existing within the battery.

In the customary fashion, each of the cells within the battery 20 includes a plurality of parallel, spaced apart plates 34 which are mechanically and electrically joined via transversely extending metallic strap 36. Outermost plates 34 of adjacent cells, for example, cells 22, 24 are customarily electrically and mechanically joined by means of a pair of upstanding yoke members 40 integral, respectively, with the outermost plates 34 of the adjacent cells 22, 24, and a conductive bridge member (not shown) which is suitably joined to the extremities of the yoke members 40 to complete the mechanical and electrical connection between the adjacent cells.

This customary construction, however, is modified for purposes of the invention to the extent that the conductive bridge member is removed and discarded. In place of the bridge member, contacts 44, 46 which are integral with and project from the circuit board 32 are engageably received by the extremities of the yoke members 40 associated with each of the adjacent cells 22, 24.

In a manner which will be described subsequently, the circuit board 32 is operable to either close the circuit across the adjacent yoke members 40 to thereby assure the presence of an EMF across the terminal posts 28, 30 or, alternatively, to prevent an EMF from occurring.

Figure 3:
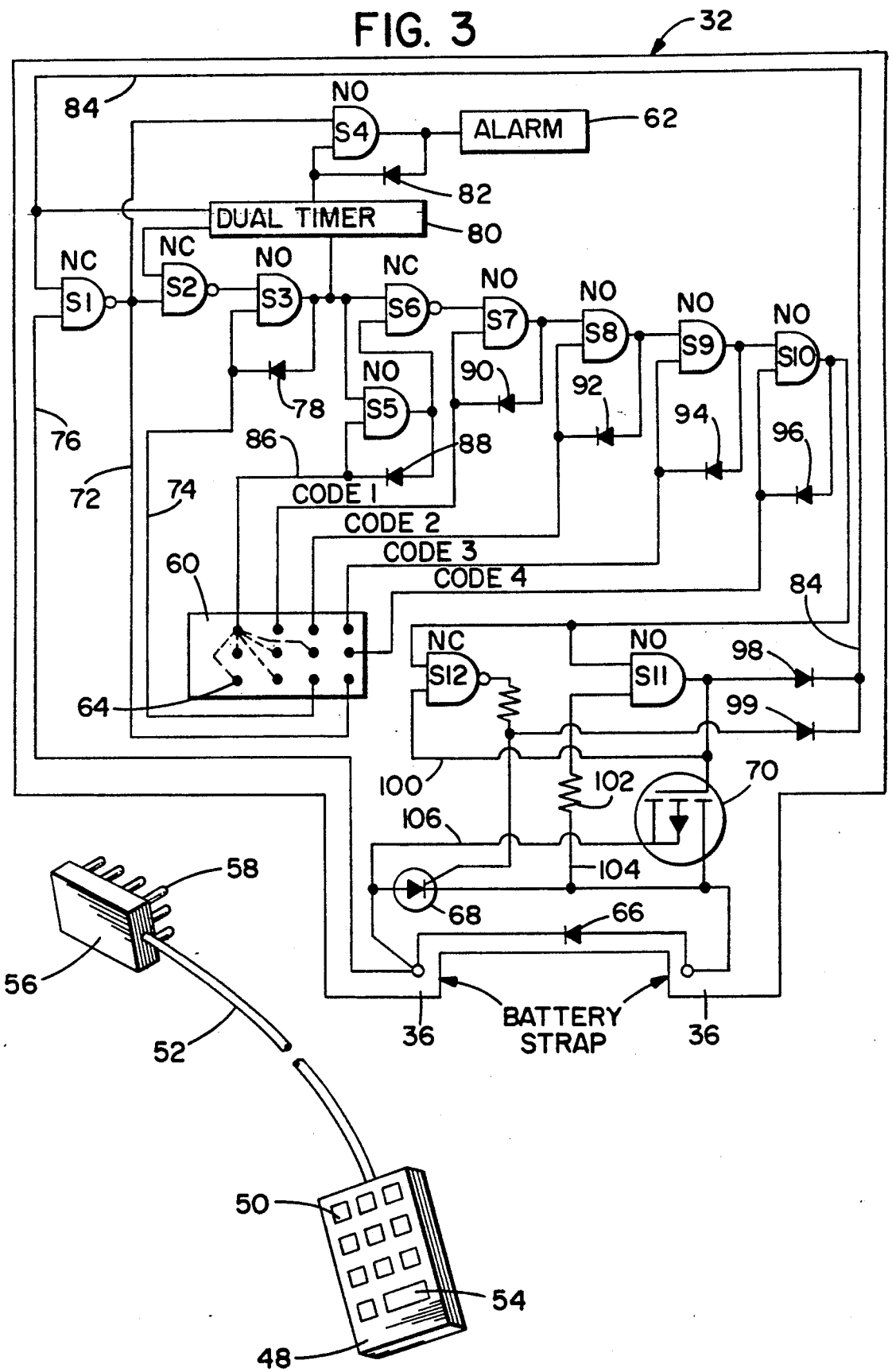
FIG. 3 is a schematic diagram of electrical circuitry for operating the invention together with a perspective view of a key pad and male connector which are also employed by the invention.

Viewing FIGS. 2 and 3, a remote actuating mechanism such as a key pad 48 is provided which may be mounted, for example, on the dashboard of the motor vehicle. The key pad may be a commercially available unit equipped with a plurality of switch buttons 50 numbered, for example, from 0 through 9 and normally biased to an open position but which, when pressed, momentarily closes an associated contact to connect an associated lead of a bundle 52 to ground in a known manner. The key pad 48 also includes an "on" switch 54 which is similarly connected with an associated lead within the bundle 52. The bundle 52 extends from the key pad 48 on the dashboard, then beneath the hood of the motor vehicle to the region of the battery 20. The bundle 52 terminates at a male connector 56 having a plurality of contact elements 58, each being associated with a particular lead of the bundle, and, eventually, either with a particular one of the switch buttons 50 or with the "on" switch 54.

The printed circuit board 32 is suitably shaped and positioned within the battery 20 such that a integral female connector 60 protrudes through an associated opening 60A in a cover 61 of the battery 20. The female connector 60 may be generally flush with or extend slightly above the upper surface of the cover 61. Similarly, an audible alarm 62 which is mounted on the printed circuit board 32 protrudes through an associated opening 62A of the cover 61 and is substantially flush with the upper surface of the battery 20 as well. The female connector 60 is provided with a plurality of contact elements 64 which are matingly engageable with the contact elements 58 of the male connector 56. Hence, for operation of the invention, the male connector 56 is joined to the female connector 60 at the battery 20 enabling the operator of the motor vehicle to control the printed circuit board 32 by means of the key pad 48 on the dashboard of the motor vehicle.

Turn now primarily to FIG. 3 which depicts, schematically, electronic circuitry of the printed circuit board 32 positioned within the battery 20. In the manner previously described, it will be noted that a diode 66 serves to electrically connect the straps 36 of the cells 24 and 26 to allow current from a battery charger (not shown) to recharge the battery whenever necessary or desirable. In the same region of the schematic diagram, the printed circuit board 32 is seen to be provided with a silicon controlled rectifier (SCR) 68 which is operable to close the circuit as well as an enhancement type, P channel power transistor 70 which operates to short circuit the SCR 68, causing it to cease its conduction. The transistor 70 is of the momentary type such that after a brief time, the circuit is open between cells 24 and 26.

Consider the situation in which the battery has already been rendered inoperative, that is, in which there is no detectable EMF between the terminal posts 28 and 30. In order to render the battery operative, the operator of the motor vehicle who, for purposes of this description may be either an authorized person or an unauthorized person, presses the "on" switch 54 which serves to momentarily connect jumper 72 with line 74. The line 76 is energized by the battery such that current passes through normally closed gate S1, then through normally closed gate S2. Gate S3 is normally open. However, because the output from S2 is high and the input to S3 from line 74 has also become high, gate S3 becomes closed and by reason of a latch diode 78 becomes and remains latched in the closed position. With the closing of gate S3, a dual timer 80 which may be, for example, a pair of Model TLC555 CMOS timers sold by Tandy Corporation becomes energized and delivers an output to gate S2 which is low for approximately 10 seconds, then becomes high momentarily thereby opening normally closed gate S2 since it is a NAND gate. Immediately thereafter, gate S2 returns to the closed position.

The output from the dual timer 80 to gate S4 is high which, together with the high from gate S1, operates to close gate S4 and operate the alarm 62. A latch diode 82 retains gate S4 in the closed position so long as the circuit remains energized. After the lapse of two to three minutes, as desired, the dual timer 80 imparts a high to gate S1 via line 84 which previously had been low. The two highs being inputted into gate S1, its output goes low, being a NAND gate, thereby cutting off the alarm 62.

With gate S1 thus open, the entire circuit is deenergized and the battery 20 remains inoperative. It is the intent of the invention that the proper switch buttons 50 on key pad 48 will have been pressed within the 10 second initial time period established by dual timer 80 to close the normally open gates S7, S8, S9, and S10. Whenever any of the switch buttons 50 other than the four proper or code buttons are depressed, current is caused to pass through line 86 by reason of the ganged nature of the contacts associated with the non-code switch buttons 50. Accordingly, operation of any of the switch buttons 50, other than code, serves to close normally open gate S5 which is then latched closed by reason of latch diode 88. The output of gate S5 thereby imparts a high to gate S6. Another high is simultaneously imparted to gate S6 from the output of gate S3 with the result that normally closed gate S6 is opened.

However, when switch buttons 50 are operated in the proper sequence to close normally open gates S7, S8, S9 and S10, each being latched closed by reason of its associated latch diode 90, 92, 94, 96, respectively, a high out of gate S10 is imparted to both gates S11 and S12. Current thereby passes through normally closed gate S12 triggering SCR 68. This enables current flow across contacts 44, 46 and through the battery strap 36. Current also flows through line 84 to gate S1 providing a high, coupled with the high it always has. This produces a low, opening gate S1, thereby deenergizing the circuit. The previous low into gate S11 via line 104 now becomes high by reason of the current flow through the battery strap 36. Notwithstanding this development, however, normally open gate S11 remains open. This is because gate S1 had previously opened, deenergizing the entire circuit. At this point, EMF is realized across the terminal posts 28, 30 of battery 20 and the motor vehicle is operable.

In short, from the foregoing, it can be seen that gate S12 triggers SCR 68 and gate S1; gate S11 triggers transistor 70 and gate S1 as well as providing a high to open gate S12. Also, diodes 98 and 99 are provided in line, respectively, with the output from gates S11 and S12 to prevent cross-over triggering.

Subsequently, when the operator of the motor vehicle desires to render the battery 20 inoperative, he or she presses the proper sequence of switch buttons 50 to operate gates S7, S8, S9, and S10. Again, as previously, a high from gate S10 is imparted to gate S11 which also has a high imparted to it via line 104. In this instance, normally open switch S11 is closed and thereby triggers the transistor 70. Current also goes through line 84 to gate S1 providing a high, coupled with the high always present, producing a low opening gate S1 and thereby deenergizing the circuit. Simultaneously, the high into gate S12 from gate S10 combines with the high into gate S12 from line 100 resulting in a low output because of the fact that gate S12 is an exclusive OR gate. Transistor 70, triggered by gate S11, momentarily short circuits SCR 68 by passing it, thus cutting off power. It reverts to an open switch thereby eliminating current flow through the battery strap 36. Current is also imparted from gate S11 to gate S1 via line 84 and serves to deenergize the entire system. Once again, the battery is rendered inoperative.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for deterring theft of a motor vehicle comprising:
    a battery having a plurality of cells providing electrical energy for the motor vehicle; and
    interface means within said battery for electrically connecting adjacent ones of said cells of said battery to provide electrical continuity between said cells by reason of which an EMF is generated, said interface means being selectively operable for disconnecting said adjacent cells to interrupt generation of an EMF thereby rendering said battery inoperative, said interface means including electronic circuitry coupled to a plurality of code entry switches and responsive to a predetermined sequential activation thereof for providing electrical continuity between the cells in one instance and for preventing electrical continuity in another instance.

2. A theft deterrent system as set forth in claim 1 wherein said electronic circuitry includes:
    alarm means responsive to activation of said code entry switches in a sequence other than said predetermined sequential activation thereof.

3. A theft deterrent system as set forth in claim 2 wherein said alarm means is an audible alarm.

4. A theft deterrent system as set forth in claim 2 including:
    timer means for initiating operation of said alarm means after a first predetermined period of time responsive to activation of said code entry switches in a sequence other than said predetermined sequential activation thereof.

5. A theft deterrent system as set forth in claim 4 wherein said timer means is operable for terminating operation of said alarm means after a second predetermined period of time being of longer duration than said first period of time.

6. A system for deterring theft of a motor vehicle comprising:
    a battery installed in the motor vehicle providing electrical energy therefor and having at least a pair of adjacent cells;
    interface means within said battery for electrically connecting said cells to provide electrical continuity therebetween by reason of which an EMF is generated; and
    switch means selectively operable for disconnecting said cells to interrupt generation of an EMF thereby rendering the battery inoperative, said interface means including electronic circuitry coupled to a plurality of code entry switches and responsive to a predetermined sequential activation thereof for providing electrical continuity between the cells in one instance and for preventing electrical continuity in another instance.

7. A theft deterrent system as set forth in claim 6 wherein said electronic circuitry includes:
    alarm means responsive to activation of said code entry switches in a sequence other than said predetermined sequential activation thereof.

8. A theft deterrent system as set forth in claim 7 wherein said alarm means is an audible alarm.

9. A theft deterrent system as set forth in claim 6 including:
    timer means for initiating operation of said alarm means after a first predetermined period of time in the event of activation of said code entry switches in a sequence other than said predetermined sequential activation thereof.

10. A theft deterrent system as set forth in claim 9 wherein said timer means is operable for terminating operation of said alarm means after a second predetermined period of time being of longer duration than said first period of time.

11. A theft deterrent system as set forth in claim 1 wherein said electronic circuitry is embedded within the battery interposed between said adjacent cells; and
    wherein said interface means includes:
    female connector means protruding from an outer surface of said battery and electrically connected with said electronic circuitry;
    a key pad including a plurality of actuating switches, each biased open but manually movable to a closed position, said actuating switches being greater in number than said code entry switches;
    male connector means having a plurality of contacts matingly engageable with said female connector;
    a plurality of leads extending from said key pad to said male connector means, each of said leads connecting one of said actuating switches with one of said contacts;
    whereby, when said male and said female connector means are matingly engaged, activation of said actuating switches in one predetermined sequence is effective to provide electrical continuity between said adjacent cells thereby rendering said battery operative while activation of said actuating switches in any other sequence is ineffective to provide electrical continuity between said adjacent cells thereby rendering said battery inoperative.

12. A theft deterrent system as set forth in claim 6 wherein said interface means include:
    a circuit board supporting electronic circuitry thereon, said circuit board being embedded within said battery and interposed between said adjacent cells, said electronic circuitry including a plurality of code entry switches manually activatable in a predetermined sequence for providing electrical continuity between said cells in one instance and for preventing electrical continuity in another instance;

wherein said battery includes a cover having at least first and second openings therethrough; and including:

female connector means being part of said electronic circuitry protruding through said first opening in said cover; and remote actuating means including:

a key pad including a plurality of actuating switches, each biased open but manually movable to a closed position, said actuating switches being greater in number than said code entry switches;

male connector means having a plurality of contacts matingly engageable with said female connector; and a plurality of leads extending from said key pad to said male connector means, each of said leads connecting one of said actuating switches with one of said contacts;

whereby, when said male and said female connector means are matingly engaged, activation of said actuating switches according to one predetermined sequence is effective to provide electrical continuity between said adjacent cells thereby rendering the battery operative while activation of said actuating switches according to any other sequence is ineffective to provide electrical continuity between said adjacent cells thereby rendering the battery inoperative.

13. A theft deterrent system as set forth in claim 12 wherein said interface means includes:

audible alarm means mounted on said circuit board and operable in the event of activation of said code entry switches in a sequence other than said predetermined sequence, said alarm means protruding through said second opening in said cover.

* * * * *